(12) United States Patent
Sheridan

(10) Patent No.: US 11,814,976 B2
(45) Date of Patent: *Nov. 14, 2023

(54) GEARED GAS TURBINE ENGINE WITH OIL DEAERATOR AND AIR REMOVAL

(71) Applicant: Raytheon Technologies Corporation, Farmington, CT (US)

(72) Inventor: William G. Sheridan, Southington, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/586,875

(22) Filed: Jan. 28, 2022

(65) Prior Publication Data

US 2022/0307387 A1 Sep. 29, 2022

Related U.S. Application Data

(63) Continuation of application No. 17/016,935, filed on Sep. 10, 2020, now Pat. No. 11,248,494, which is a
(Continued)

(51) Int. Cl.
*F01D 25/18* (2006.01)
*F01D 25/20* (2006.01)
(Continued)

(52) U.S. Cl.
CPC ......... *F01D 25/18* (2013.01); *B01D 19/0068* (2013.01); *B01D 19/0073* (2013.01);
(Continued)

(58) Field of Classification Search
CPC ...................................................... F01D 25/18
See application file for complete search history.

(56) References Cited

U.S. PATENT DOCUMENTS 2,258,792 A    4/1941 New
2,936,655 A    5/1960 Peterson et al.
(Continued)

FOREIGN PATENT DOCUMENTS

EP    0791383    8/1997
EP    1142850    10/2001
(Continued)

OTHER PUBLICATIONS

European Search Report for European Application No. 15178688.6 completed Dec. 23, 2015.
(Continued)

*Primary Examiner* — Thuyhang N Nguyen
(74) *Attorney, Agent, or Firm* — Carlson, Gaskey & Olds, P.C.

(57) ABSTRACT

A gas turbine engine has a fan drive turbine for driving a gear reduction. The gear reduction drives a fan rotor. A lubrication system supplies oil to the gear reduction, and includes a lubricant pump to supply an air/oil mixture to an inlet of a deaerator. The deaerator includes a separator for separating oil and air, delivering separated air to an air outlet, and delivering separated oil back into an oil tank. The separated oil is first delivered into a pipe outwardly of the oil tank, and then into a location beneath a minimum oil level in the tank. Air within the oil tank moves outwardly through an air exit into the deaerator. A method of designing a gas turbine engine is also disclosed.

29 Claims, 8 Drawing Sheets

Related U.S. Application Data continuation of application No. 16/684,926, filed on Nov. 15, 2019, now Pat. No. 11,066,954, which is a continuation of application No. 16/108,540, filed on Aug. 22, 2018, now Pat. No. 10,480,350, which is a continuation of application No. 14/794,866, filed on Jul. 9, 2015, now Pat. No. 10,060,289.

(60) Provisional application No. 62/030,105, filed on Jul. 29, 2014.

(51) Int. Cl.
*F02C 7/06* (2006.01)
*B01D 19/00* (2006.01)

(52) U.S. Cl.
CPC .............. *F01D 25/20* (2013.01); *F02C 7/06* (2013.01); *F05D 2260/609* (2013.01); *Y02T 50/60* (2013.01)

(56) References Cited

U.S. PATENT DOCUMENTS

| | | | |
|---|---|---|---|
| 3,021,731 A | 2/1962 | Stoeckicht | |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,528,241 A | 9/1970 | Venable et al. | |
| 3,612,083 A * | 10/1971 | Kronk | F01D 25/18 137/565.33 |
| 3,664,612 A | 5/1972 | Skidmore et al. | |
| 3,722,624 A * | 3/1973 | Buckland | F01D 25/183 277/432 |
| 3,747,343 A | 7/1973 | Rosen | |
| 3,754,484 A | 8/1973 | Roberts | |
| 3,765,623 A | 10/1973 | Donelson et al. | |
| 3,820,719 A | 6/1974 | Clark | |
| 3,843,277 A | 10/1974 | Ehrich | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,049,401 A | 9/1977 | Smith | |
| 4,093,428 A * | 6/1978 | Swogger | B01D 19/0057 96/209 |
| 4,130,872 A | 12/1978 | Harloff | |
| 4,220,171 A | 9/1980 | Ruehr | |
| 4,240,250 A | 12/1980 | Harris | |
| 4,284,174 A | 8/1981 | Salvana et al. | |
| 4,289,360 A | 9/1981 | Zirin | |
| 4,478,551 A | 10/1984 | Honeycutt, Jr. et al. | |
| 4,649,114 A | 3/1987 | Miltenburger et al. | |
| 4,667,774 A * | 5/1987 | Roberge | F16H 1/14 184/6.12 |
| 4,696,156 A | 9/1987 | Burr et al. | |
| 4,722,357 A | 2/1988 | Wynosky | |
| 4,979,362 A | 12/1990 | Vershure, Jr. | |
| 5,028,318 A * | 7/1991 | Aslin | B04C 3/06 95/271 |
| 5,058,617 A | 10/1991 | Stockman et al. | |
| 5,102,379 A | 4/1992 | Pagluica et al. | |
| 5,141,400 A | 8/1992 | Murphy et al. | |
| 5,317,877 A | 6/1994 | Stuart | |
| 5,361,580 A | 11/1994 | Ciokajlo et al. | |
| 5,433,674 A | 7/1995 | Sheridan et al. | |
| 5,447,411 A | 9/1995 | Curley et al. | |
| 5,466,198 A | 11/1995 | McKibbin et al. | |
| 5,472,383 A | 12/1995 | McKibbin | |
| 5,524,847 A | 6/1996 | Brodell et al. | |
| 5,634,767 A | 6/1997 | Dawson | |
| 5,677,060 A | 10/1997 | Terentieva et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,026,839 A * | 2/2000 | Kriebel | F16L 53/32 137/340 |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,709,492 B1 | 3/2004 | Spadaccini et al. | |
| 6,814,541 B2 | 11/2004 | Evans et al. | |
| 6,883,303 B1 | 4/2005 | Seda | |
| 7,021,042 B2 | 4/2006 | Law | |
| 7,219,490 B2 | 1/2007 | Dev | |
| 7,328,580 B2 | 2/2008 | Lee et al. | |
| 7,374,403 B2 | 5/2008 | Decker et al. | |
| 7,387,189 B2 | 6/2008 | James et al. | |
| 7,435,290 B2 * | 10/2008 | Lane | F01D 25/18 55/460 |
| 7,591,754 B2 | 9/2009 | Duong et al. | |
| 7,632,064 B2 | 12/2009 | Somanath | |
| 7,662,059 B2 | 2/2010 | McCune | |
| 7,806,651 B2 | 10/2010 | Kennepohl et al. | |
| 7,824,305 B2 | 11/2010 | Duong et al. | |
| 7,828,682 B2 | 11/2010 | Smook | |
| 7,926,260 B2 | 4/2011 | Sheridan et al. | |
| 7,997,868 B1 | 8/2011 | Liang et al. | |
| 8,201,664 B2 | 6/2012 | Brouillet et al. | |
| 8,205,432 B2 | 6/2012 | Sheridan | |
| 8,602,165 B2 | 12/2013 | Szolomayer et al. | |
| 10,480,350 B2 * | 11/2019 | Sheridan | F01D 25/20 |
| 2006/0228206 A1 | 10/2006 | Decker | |
| 2008/0003096 A1 | 1/2008 | Kohli et al. | |
| 2008/0116009 A1 | 5/2008 | Sheridan et al. | |
| 2008/0179227 A1 | 7/2008 | Saito | |
| 2008/0317588 A1 | 12/2008 | Grabowski et al. | |
| 2009/0056343 A1 | 3/2009 | Suciu et al. | |
| 2009/0120296 A1 | 5/2009 | Saito | |
| 2009/0235630 A1 | 9/2009 | Norris | |
| 2009/0304518 A1 | 12/2009 | Kodama et al. | |
| 2009/0314881 A1 | 12/2009 | Suciu et al. | |
| 2010/0105516 A1 | 4/2010 | Sheridan et al. | |
| 2010/0148396 A1 | 6/2010 | Xie et al. | |
| 2010/0196170 A1 * | 8/2010 | Chen | F04B 39/0207 62/84 |
| 2010/0212281 A1 | 8/2010 | Sheridan | |
| 2010/0218483 A1 | 9/2010 | Smith | |
| 2010/0331139 A1 | 12/2010 | McCune | |
| 2011/0159797 A1 | 6/2011 | Beltman et al. | |
| 2011/0293423 A1 | 12/2011 | Bunker et al. | |
| 2012/0124964 A1 | 5/2012 | Hasel et al. | |
| 2013/0153672 A1 | 6/2013 | Price et al. | |
| 2013/0186058 A1 * | 7/2013 | Sheridan | F01D 25/168 60/226.1 |
| 2014/0140824 A1 | 5/2014 | Sheridan | |

FOREIGN PATENT DOCUMENTS

| | | |
|---|---|---|
| GB | 1516041 | 6/1978 |
| GB | 2041090 | 9/1980 |
| GB | 2426792 | 12/2006 |
| WO | 2007038156 | 4/2007 |
| WO | 2014066815 A1 | 5/2014 |

OTHER PUBLICATIONS

Linke-Diesinger, Andreas, An Introduction to Systems Functions, 2008, Springer Berlin Heidelberg, pp. 49-65.

Safran Snecma, CFM56-7B, 2011, Snecma, p. 1.

Pratt & Whitney, PW4000-94 Engine, Jan. 26, 2013, Pratt & Whitney, pp. 1-2.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

(56) References Cited

OTHER PUBLICATIONS

Kurzke, J. (2009) Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp 3-9.

Oates, G.C. (Ed). (1989). Aircraft propulsion systems and technology and design. Washington, DC.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994. pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

Guynn, M. D. Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

(56) References Cited

OTHER PUBLICATIONS

Zalud, T. (1998). Gears put a new spin on turbofan performance. Machine Design, 70(20), p. 104.

Kurzke, J. (2008). Preliminary Design, Aero-engine design: From state of the art turbofans towards innovative architectures. pp. 1-72.

Zamboni, G. and Xu, L. (2009). Fan root aerodynamics for large bypass gas turbine engines: Influence on the engine performance and 3D design. Proceedingsof ASME Turbo Expo 2009: Power for Land, Sea and Air. Jun. 3-12, 2009, Orlando, Florida, USA. pp. 1-12.

Han, J., Dutta, S., and Ekkad, S.V. (2000). Gas turbine heat transfer and cooling technology. New York, NY: Taylor & Francis. pp. 1-25, 129-157, and 160-249.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 582-685, 697-699, 703-705, 802-805, 862-864, and 923-925.

Declaration of Reza Abhari, Ph.D. In re U.S. Pat. No. 8,844,265. Executed Jun. 28, 2016. pp. 1-91.

Declaration of John Eaton, Ph.D. In re U.S. Pat. No. 8,869,568. Executed Mar. 28, 2016. pp. 1-87.

Declaration of Reza Abhari. In re U.S. Pat. No. 8,695,920. Executed Nov. 30. pp. 1-67.

Declaration of Reza Abhari. In re U.S. Pat. No. 8,448,895. Executed Nov. 28. pp. 1-81.

Declaration of Reza Abhari. In re U.S. Pat. No. 8,695,920, claims 1-4, 7-14, 17 and 19. Executed Nov. 29. pp. 1-102.

Declaration of Dr. Magdy Attia. In re U.S. Pat. No. 8,313,280. Executed Oct. 21, 2016. pp. 1-88.

Lord, W.K., MacMartin, D.G., and Tillman, T.G. (2000). Flow control opportunities in gas turbine engines. American Institute of Aeronautics and Astronautics. pp. 1-15.

Daly, M. Ed. (2010). Jane's Aero-Engine. Issue Twenty-seven. Mar. 2010. p. 633-636.

Roux, E. (2007). Turbofan and turbojet engines database handbook. Editions Elodie Roux. Blagnac: France. pp. 1-595.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Declaration of Dr. Magdy Attia. In re U.S. Pat. No. 8,517,668. Executed Dec. 8, 2016. pp. 1-81.

Cramoisi, G. Ed. (2012). Death in the Potomac: The crash of Air Florida Flight 90. Air Crash Investigations. Accident Report NTSB/AAR-82-8. p. 45-47.

Norton, M. and Karczub, D. (2003). Fundamentals of noise and vibration analysis for engineers. Press Syndicate of the University of Cambridge New York: New York. p. 524.

U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.

U.S. Department of Transportation: Federal Aviation Administration Advisory Circular. Standard operating procedures for flight deck crewmembers. Dated: Feb. 27, 2003 . . . p. 1-6 and Appendices.

Vasudevan, A.K. and Petrovic, J.J. (1992). A comparative overview of molybedenum disilicide composites. Materials Science and Engineering, A155, 1992. pp. 1-17.

Clarke, D.R. and Levi, C.G. (2003). Materials design for the next generation thermal barrier coatings. Annual. Rev. Mater. Res. vol. 33. 2003. pp. 383-417.

Lee, K.N. (2000). Current status of environmental barrier coatings for Si-Based ceramics. Surface and Coatings Technology 133-134, 2000. pp. 1-7.

Bornstein, N. (1993). Oxidation of advanced intermetallic compounds. Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

Shah, D.M. (1992). MoSi2 and other silicides as high temperature structural materials. Superalloys 1992. The Minerals, Metals, & Materials Society. pp. 409-422.

Zhao, J.C. and Westbrook, J.H. (2003). Ultrahigh-temperature materials for jet engines. MRS Bulletin. vol. 28(9). Sep. 2003. pp. 622-630.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.

Jacobson, N.S. (1993). Corrosion of silicon-based ceramics in combustion environments. J. Am. Ceram. Soc. 76(1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Jeng, Y.-L., Lavernia, E.J. (1994). Processing of molybdenum disilicide. J. of Mat. Sci. vol. 29. 1994. pp. 2557-2571.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer, pp. 1-3.

El-Sayad, A.F. (2008). Aircraft propulsion and gas turbine engines. Boca Raton, FL: CRC Press. pp. 215-219 and 855-860.

Bunker, R.S. (2005). A review of shaped hole turbine film-cooling technology. Journal of Heat Transfer vol. 127. Apr. 2005. pp. 441-453.

Anderson, R.D. (1985). Advanced Propfan Engine Technology (APET) definition study, single and counter-rotation gearbox/pitch change mechanism design. NASA CR-168115. Jul. 1, 1985. pp 1-289.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.

Gliebe, P.R., Ho, P.Y., and Mani, R. (1995). UHB engine fan and broadband noise reduction study. NASA CR-198357. Jun. 1995. pp. 1-48.

(56) References Cited

OTHER PUBLICATIONS

Holcombe, V. (2003). Aero-Propulsion Technology (APT) task V low noise ADP engine definition study. NASA CR-2003-212521. Oct. 1, 2003. pp. 1-73.

Sutliff, D. (2005). Rotating rake turbofan duct mode measurement system. NASA TM-2005-213828. Oct. 1, 2005. pp. 1-34.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

NASA Conference Publication. (1978). CTOL transport technology. NASA-CP-2036-PT-1. Jun. 1, 1978. pp. 1-531.

Kandebo, S.W. (1998). Geared-Turbofan engine design targets cost, complexity. Aviation Week & Space Technology, 148(8). p. 34-5.

Davis, D.G.M. (1973). Variable-pitch fans: Progress in Britain. Flight International. Apr. 19, 1973. pp. 615-617.

Levintan, R.M. (1975). Q-Fan demonstrator engine. Journal of Aircraft. vol. 12( 8). Aug. 1975. pp. 658-663.

Technical Report. (1975). Quiet Clean Short-haul Experimental Engine (QCSEE) UTW fan preliminary design. NASA-CR-134842. Feb. 1, 1975. pp 1-98.

Aerospace Information Report. (2008). Advanced ducted propulsor in-flight thrust determination. SAE International AIR5450. Aug. 2008. p. 1-392.

Daggett, D.L., Brown, S.T., and Kawai, R.T. (2003). Ultra-efficient engine diameter study. NASA/CR-2003-212309. May 2003. pp. 1-52.

Haldenbrand, R. and Norgren, W.M. (1979). Airesearch QCGAT program [quiet clean general aviation turbofan engines]. NASA-CR-159758. pp. 1-199.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Baker, R.W. (2000). Membrane technology and applications. New York, NY: McGraw-Hill. pp. 87-153.

Cheryan, M. (1998). Ultrafiltration and microfiltration handbook. Lancaster, PA: Tecnomic Publishing Company, Inc. pp. 171-236.

Seader, J.D. and Henley, E.J. (1998). Separation process principles. New York, NY: John Wiley & Sons, Inc. pp. 722-726 and 764-771.

Spadaccini, L.J., and Huang, H. (2002). On-line fuel deoxygenation for coke suppression. ASME, Jun. 2002. pp. 1-7.

Darrah, S. (1987). Jet fuel deoxygenation. Interim Report for Period Mar. 1987-Jul. 1988. pp. 1-22.

Bucknell, R.L. (1973). Influence of fuels and lubricants on turbine engine design and performance, fuel and lubricant analyses. Final Technical Report, Mar. 1971-Mar. 1973. pp. 1-252.

Hazlett, R.N. (1991). Thermal oxidation stability of aviation turbine fuels. Philadelphia, PA: ASTM. pp. 1-163.

Taylor, W.F. (1974). Deposit formation from deoxygenated hydrocarbons. I. General features. Ind. Eng. Chem., Prod. Res. Develop., vol. 13(2). 1974. pp. 133-138.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.

Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.

Edwards, T. and Zabarnick, S. (1993). Supercritical fuel deposition mechanisms. Ind. Eng. Chem. Res. vol. 32. 1993. pp. 3117-3122.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Technical Data. Teflon. WS Hampshire Inc. Retrieved from: http://catalog.wshampshire.com/Asset/psg_teflon_ptfe.pdf.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Edkins, D.P., Hirschkron, R., and Lee, R. (1972). TF34 turbofan quiet engine study. Final Report prepared for NASA. NASA-CR-120914. Jan. 1, 1972. pp. 1-99.

Waters, M.H. and Schairer, E.T. (1977). Analysis of turbofan propulsion system weight and dimensions. NASA Technical Memorandum. Jan. 1977. pp. 1-65.

Meyer, A.G. (1988). Transmission development of TEXTRON Lycoming's geared fan engine. Technical Paper. Oct. 1988. pp. 1-12.

Dudley, D.W., Ed. (1962). Gear handbook. New York, NY: McGraw-Hill. pp. 14-17 (TOC, Preface, and Index).

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Gates, D. Bombardier flies at higher market. Seattle Times. Jul. 13, 2008. pp. C6.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

(56) References Cited

OTHER PUBLICATIONS

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mattingly, J.D. (1996). Elements of gas turbine propulsion. New York, New York: McGraw-Hill, Inc. pp. 1-18, 50-62, 85-87, 95-104, 121-123, 223-234, 242-245, 278-285, 303-309, 323-326, 462-479, 517-520, 563-565, 630-632, 568-670, 673-675, 682-685, 697-705, 726-727, 731-732, 802-805, 828-830 and appendices.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
Datasheet. CF6-80C2 high-bypass turbofan engines. Retrieved from https://geaviation.com/sites/default/files/datasheet-CF6-80C2.pdf.
Salemme, C.T. and Murphy, G.C. (1979). Metal spar/superhybrid shell composite fan blades. Prepared for NASA. NASA-CR-1 59594. Aug. 1979. pp. 1-127.
"Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".
Datasheet. Genx™ high bypass turbofan engines. Retrieved from: https://www.geaviation.com/sites/default/files/datasheet-genx.pdf.
Winn, A. (Ed). (1990). Wide Chord Fan Club. Flight International, 4217(137). May 23-29, 1990. pp. 34-38.
Parker, R.G. and Lin, J. (2001). Modeling, modal properties, and mesh stiffness variation instabilities of planetary gears. Prepared for NASA. NASA/CR-2001-210939. May 2001. pp. 1-111.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1954). Handbook of practical gear design. Lancaster, PA: Technomic Publishing Company, Inc. pp. 3.96-3.102 and 8.12-8.18.
Dudley, D.W., Ed. (1962). Gear handbook. New York, NY: McGraw-Hill. pp. 3.14-3.18 and 12.7-12.21.
Dudley, D.W., Ed. (1994). Practical gear design. New York, NY: McGraw-Hill. pp. 119-124.
Product Brochure. Garrett TFE/31. Allied Signal. Copyright 1987. pp. 1-24.
Honeywell Learjet 31 and 35/36 TFE731-2 to 2C Engine Upgrade Program. Sep. 2005. pp. 1-4.
Honeywell Sabreliner 65 TFE731-3 to -3D Engine Upgrade Program. Oct. 2005. pp. 1-4.
U.S. Department of Transportation: Federal Aviation Administration Type Certificate Data Sheet No. E6WE. Dated: May 9, 2000. p. 1-9.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Presented at the International Gas Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
About GasTurb. Retrieved Jun. 26, 2018 from: http://gasturb.de/about-gasturb.html.
Kurzke, J. (2001). GasTurb 9: A program to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes—SolidWorks Corporation. pp. 1-156.
Macisaac, B. and Langston, R. (2011). Gas turbine propulsion systems. Chichester, West Sussex: John Wiley & Sons, Ltd. pp. 260-265.
Datasheet. CFM56-5B for the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.
Wikipedia. Torsion spring. Retreived Jun. 29, 2018 from: https://en.wikipedia.org/wiki/Torsion_spring.
AGMA Standard (2006). Design manual for enclosed epicyclic gear drives. Alexandria, VA: American Gear Manufacturers Association. pp. 1-104.
AGMA Standard (1997). Design and selection of components for enclosed gear drives, lexandria, VA: American Gear Manufacturers Association. pp. 1-48.
Daly, M. Ed. (2007). Jane's Aero-Engine. Issue Twenty-three. Mar. 2008. p. 707-12.
AGMA Standard (1999). Flexible couplings—Mass elastic properties and other characteristics. Alexandria, VA: American Gear Manufacturers Association. pp. 1-46.
Wikipedia. Stiffness. Retrieved Jun. 28, 2018 from: https://en.wikipedia.org/wiki/Stiffness.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Hill, P.G., Peterson, C.R. (1965). Mechanics and thermodynamics of propulsion. Addison-Wesley Publishing Company, Inc. pp. 307-308.

(56) References Cited

OTHER PUBLICATIONS

Hill, P.G., Peterson, C.R. (1992). Mechanics and thermodynamics of propulsion, 2nd Edition. Addison-Wesley Publishing Company, Inc. pp. 400-406.

Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.

Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.

Gray, D.E. and Gardner, W.B. (1983). Energy efficient engine program technology benefit/cost study- volume 2. NASA CR-174766. Oct. 1983. pp. 1-118.

Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.

Groweneweg, J.F. (1994). Fan noise research at NASA. Noise-CON 94. Fort Lauderdale, FL. May 1-4, 1994. pp. 1-10.

Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.

Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.

Howe, D.C, and Wynosky, T.A. (1985). Energy efficient engine program advanced turbofan nacelle definition study. NASA-CR-174942. May 1985. pp. 1-60.

Howe, D.C, and Wynosky, T.A. (1985). Energy efficient engine program advanced turbofan nacelle definition study. NASA-CR-174942. May 1985. University of Washington dated Dec. 13, 1990. pp. 1-14.

Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.

Mattingly, J.D. (1996). Elements of gas turbine propulsion. New York, New York: McGraw-Hill, Inc. pp. 1-18, 30-62, 223-234, 462-479, 517-520, 757-767, and 862-864.

Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.

Johnston, R.P. and Hemsworth, M.C. (1978). Energy efficient engine preliminary design and integration studies. Jun. 1, 1978. pp. 1-28.

Awker, R.W. (1986). Evaluation of propfan propulsion applied to general aviation. NASA CR-175020. Mar. 1, 1986. pp. 1-140.

Howe, D.C. and Wynosky, T.A. (1985). Energy efficient engine program advanced turbofan nacelle definition study. NASA CR-174942. May 1, 1985. pp. 174.

Singh, B. (1986). Small engine component technology (SECT) study. NASA CR-175079. Mar. 1, 1986. pp. 1-102.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.

\* cited by examiner

GEARED GAS TURBINE ENGINE WITH OIL DEAERATOR AND AIR REMOVAL

CROSS-REFERENCE TO RELATED APPLICATION

This application is a continuation of U.S. patent application Ser. No. 17/016,935 filed on Sep. 10, 2020, which is a continuation of U.S. patent application Ser. No. 16/684,926 filed on Nov. 15, 2019, now U.S. Pat. No. 11,066,954 granted Jul. 20, 2021, which continuation of U.S. patent application Ser. No. 16/108,540 filed on Aug. 22, 2018, now U.S. Pat. No. 10,480,350 granted Nov. 19, 2019, which is a continuation of U.S. patent application Ser. No. 14/794,866 filed on Jul. 9, 2015, now U.S. Pat. No. 10,060,289 granted Aug. 28, 2018, which claims priority to U.S. Provisional Patent Application No. 62/030,105, filed Jul. 29, 2014.

BACKGROUND OF THE INVENTION

Gas turbine engines are known and, typically, include a fan delivering air into a bypass duct as propulsion air. The fan also delivers air into a core engine where it passes to a compressor. The air is compressed in the compressor and delivered downstream into a combustion section where it is mixed with fuel and ignited. Products of this combustion pass downstream over turbine rotors driving them to rotate.

Historically, the fan rotor and a fan drive turbine rotor have been driven at the same speed. This placed a restriction on the desirable speed of both the fan and the fan drive turbine.

More recently, it has been proposed to provide a gear reduction between the fan drive turbine and the fan rotor.

The gear reduction is a source of increased heat loss. As an example, a geared turbofan engine creates about twice as much heat loss as a non-geared turbofan engine. In addition, the weight of the engine increases due to the weight of the gear reduction.

It has typically been the case that a designer of a gas turbine engine sizes an oil tank such that the oil can sit in the oil tank long enough to de-aerate. On a normal turbofan engine, this had been approximately at least ten seconds.

SUMMARY OF THE INVENTION

In a featured embodiment, a gas turbine engine has a fan drive turbine for driving a gear reduction. The gear reduction drives a fan rotor. A lubrication system supplies oil to the gear reduction, and includes a lubricant pump to supply an air/oil mixture to an inlet of a deaerator. The deaerator includes a separator for separating oil and air, delivering separated air to an air outlet, and delivering separated oil back into an oil tank. The separated oil is first delivered into a pipe outwardly of the oil tank, and then into a location beneath a minimum oil level in the tank. Air within the oil tank moves outwardly through an air exit into the deaerator.

In another embodiment according to the previous embodiment, the deaerator has an air outlet, and an exit guide extending into the deaerator from the air outlet. The deaerator inlet delivers the air/oil mixture about the exit guide, and against a wall of the deaerator such that air and oil are separated.

In another embodiment according to any of the previous embodiments, the separated oil enters the oil tank through a diffusor.

In another embodiment according to any of the previous embodiments, an inlet velocity to the deaerator is less than or equal to 14 feet/second, and an exit velocity from the deaerator of the separated air is less than or equal to 14 feet/second.

In another embodiment according to any of the previous embodiments, a deaerator exit delivers oil into the oil tank at least 2 inches (5.08 centimeters) below the minimum oil level within the tank.

In another embodiment according to any of the previous embodiments, a dwell time of oil in the tank as removed by the oil pump, on average, is five seconds or less.

In another embodiment according to any of the previous embodiments, the oil tank may hold greater than or equal to 25 and less than or equal to 35 quarts of oil.

In another embodiment according to any of the previous embodiments, the engine is rated greater than or equal to 15,000 and less than or equal to 35,000 lbs in rated thrust at take-off.

In another embodiment according to any of the previous embodiments, the oil tank holds greater than or equal to 35 and less than or equal to 50 quarts of oil.

In another embodiment according to any of the previous embodiments, the oil tank is associated with an engine having greater than or equal to 35,000 and less than or equal to 100,000 lbs in rated thrust at take-off.

In another embodiment according to any of the previous embodiments, the gear reduction includes a sun gear for driving intermediate gears. Oil baffles are located circumferentially between the intermediate gears.

In another embodiment according to any of the previous embodiments, an oil capture gutter surrounds the gear reduction.

In another embodiment according to any of the previous embodiments, an oil capture gutter surrounds the gear reduction.

In another embodiment according to any of the previous embodiments, the air exit from the oil tank passes around a deflector to remove oil that may still be mixed with the air.

In another embodiment according to any of the previous embodiments, the air exit includes a baffle extending away from an end of the deaerator, and toward the air outlet.

In another featured embodiment, a method of designing a gas turbine engine comprises providing a fan drive turbine for driving a gear reduction. The gear reduction drives a fan rotor. A lubrication system with an oil tank is provided to supply oil to the gear reduction. The lubrication system includes a lubricant pump. An air/oil mixture is supplied to an inlet of a deaerator. The deaerator includes a separator for separating oil and air, delivering separated air to an air outlet, and delivering separated oil back into an oil tank. The separated oil is first delivered into a pipe outwardly of the oil tank, and then into a location beneath a minimum oil level in the tank. Air within the oil tank moves outwardly through an air exit into the deaerator.

In another embodiment according to the previous embodiment, the deaerator has an air outlet, and an exit guide extending into the deaerator from the air outlet. The deaerator inlet delivers the air/oil mixture about the exit guide, and against a wall of the deaerator such that air and oil are separated.

In another embodiment according to any of the previous embodiments, the separated oil enters the oil tank through a diffusor.

In another embodiment according to any of the previous embodiments, the air exit from the oil tank passes around a deflector to remove oil that may still be mixed with the air.

In another embodiment according to any of the previous embodiments, the air exit includes a baffle extending away from an end of the deaerator, and toward the air outlet.

DETAILED DESCRIPTION

Figure 1:
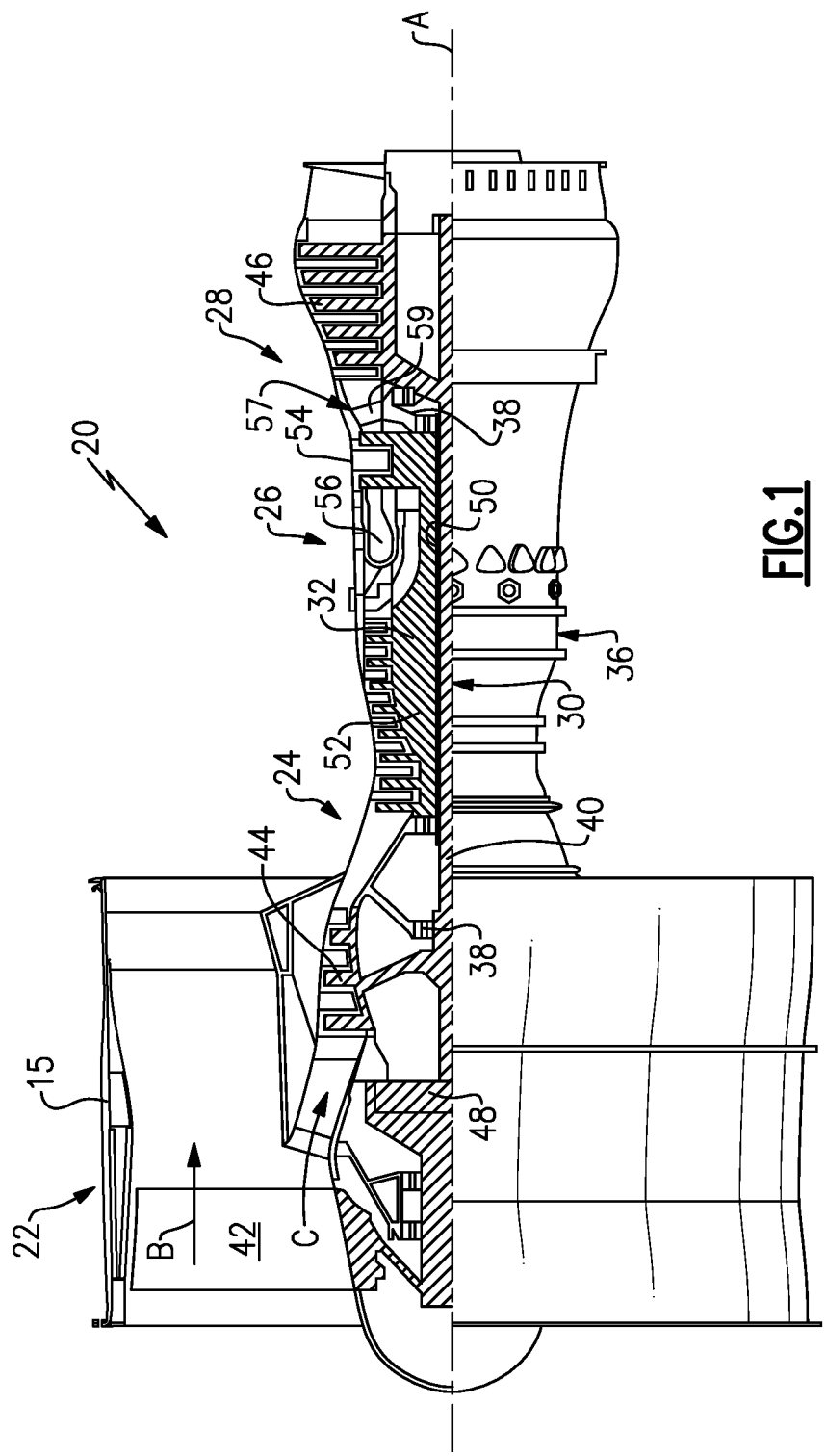
FIG. 1 is a schematic view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than or equal to about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than or equal to about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
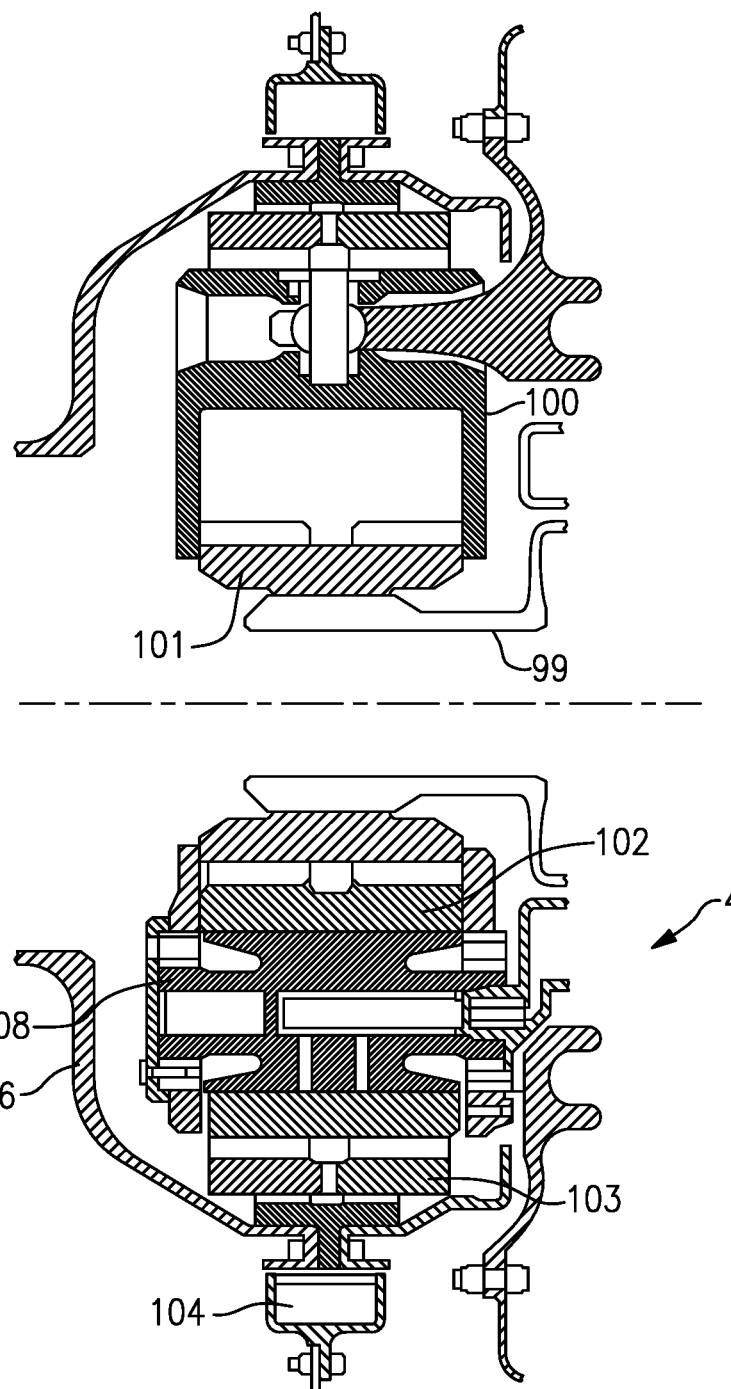
FIG. 2 shows a portion of a gear reduction.

As shown in FIG. 2, a flexible shaft 99, which is driven by the turbine 46, drives a sun gear 101 which, in turn, engages and drives intermediate gears 102. In some embodiments, the intermediate gears 102 may be planet gears of a planetary epicyclic gear system. In other embodiments, the intermediate gears 102 may be star gears of a star epicyclic gear system. The intermediate gears 102 engage and drive a ring gear 103 to, in turn, drive an output shaft 106, which then drives the fan rotor 42. In other embodiments, a planetary gear carrier (not shown) driven by planetary gears may drive the fan shaft. Lubricant is supplied to a journal pin 108, to the intermediate gears 102 and to other locations within the gear reduction 48.

Figure 3:
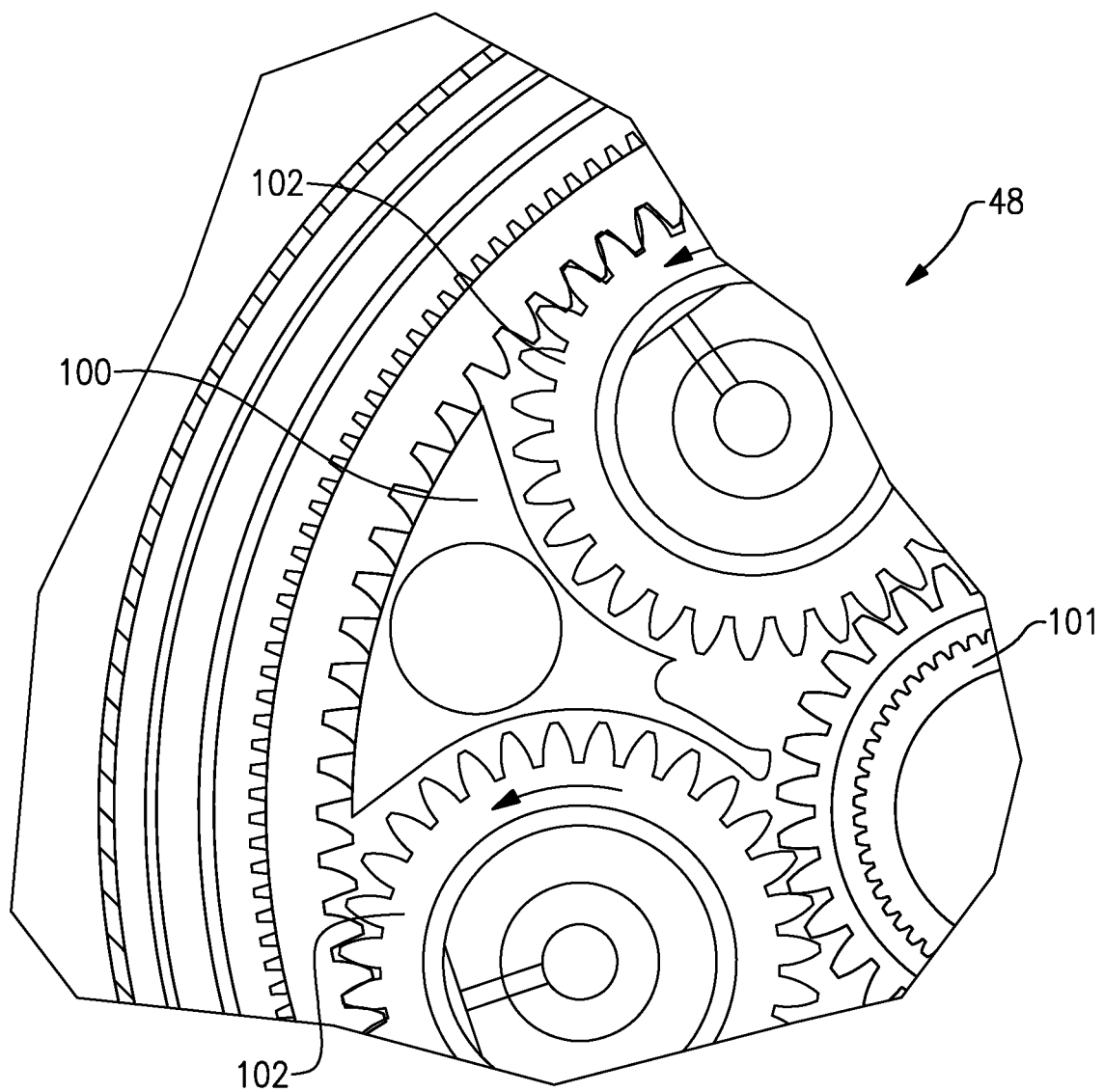
FIG. 3 shows another portion of a gear reduction.

FIG. 3 shows baffles 100 which are placed circumferentially between adjacent planet gears 102.

An oil capture gutter 104 (shown in FIG. 2) surrounds the gear reduction 48 and captures oil that has left the gear reduction. Oil from the gear reduction 48 is returned to a pump 72 (See FIG. 4) or a tank 90 as shown schematically in FIG. 4. As shown, a lubricant system 70 includes the gear reduction 48 which may be structured as shown in FIGS. 2 and 3. Notably, complete details of the operation of the baffle, the gutter and the other portions of the gear reduction may be as disclosed in U.S. Pat. No. 6,223,616, the disclosure of which with regard to the operation of the gear reduction is incorporated by reference.

Oil flows from an oil pump 72 to a filter 74 through a pressure relief valve 76 to an air/oil cooler 78 and then to a fuel/oil cooler 80. The oil may pass through an oil pressure trim orifice 82 and back to the tank 90. Alternatively, the oil may pass through a strainer 84 and then to the gear reduction 48. Oil returning from the gear reduction and, in particular, from the gutter, may pass back directly to the pump 72 or to the tank 90. This is a simplification of the overall lubricant system and, as appreciated, there may be other components.

Applicant has recognized that by utilizing baffles 100 and a gutter 104 on the gear reduction 48, which may be generally as disclosed in the above-mentioned U.S. Pat. No. 6,223,616, the oil need not sit in the oil tank for ten seconds in order to de-aerate. Thus, the size of the tank 90 may be made much smaller.

Conventional turbofans allow the oil to dwell in an oil tank for approximately 7-10 seconds. The dwell time allows air bubbles to separate from the oil to prevent foaming. With the move to a geared gas turbine engine, the oil flow volumes may effectively double. This would require a much larger oil tank, and as much as twice as large if the same dwell time is allowed. Thus, it becomes important to reduce dwell time.

Applicant has discovered that oil is de-aerated by the baffles 100 and gutter system and that a dwell time in the oil tank to remove air bubbles may be less than five seconds More preferably, it may be less than or equal to about 3.0 seconds. This allows the use of oil tank 90 to be of a size roughly equivalent to the size utilized in prior non-geared gas turbine engines. A deaerator 88 is shown incorporated into the oil tank 90.

The better the deaeration before the oil reaches the tank, the shorter the dwell time that can be achieved. The disclosed deaerator achieves these very low dwell times.

As an example, an oil tank that holds 25 to 35 quarts of oil may be utilized on a geared gas turbine engine with 15,000 to 35,000 lbs in rated thrust at take-off. Further, an oil tank may be 35 quarts to 50 quarts of oil for an engine with 35,000 to 100,000 lbs in rated thrust at take-off.

Figure 4:
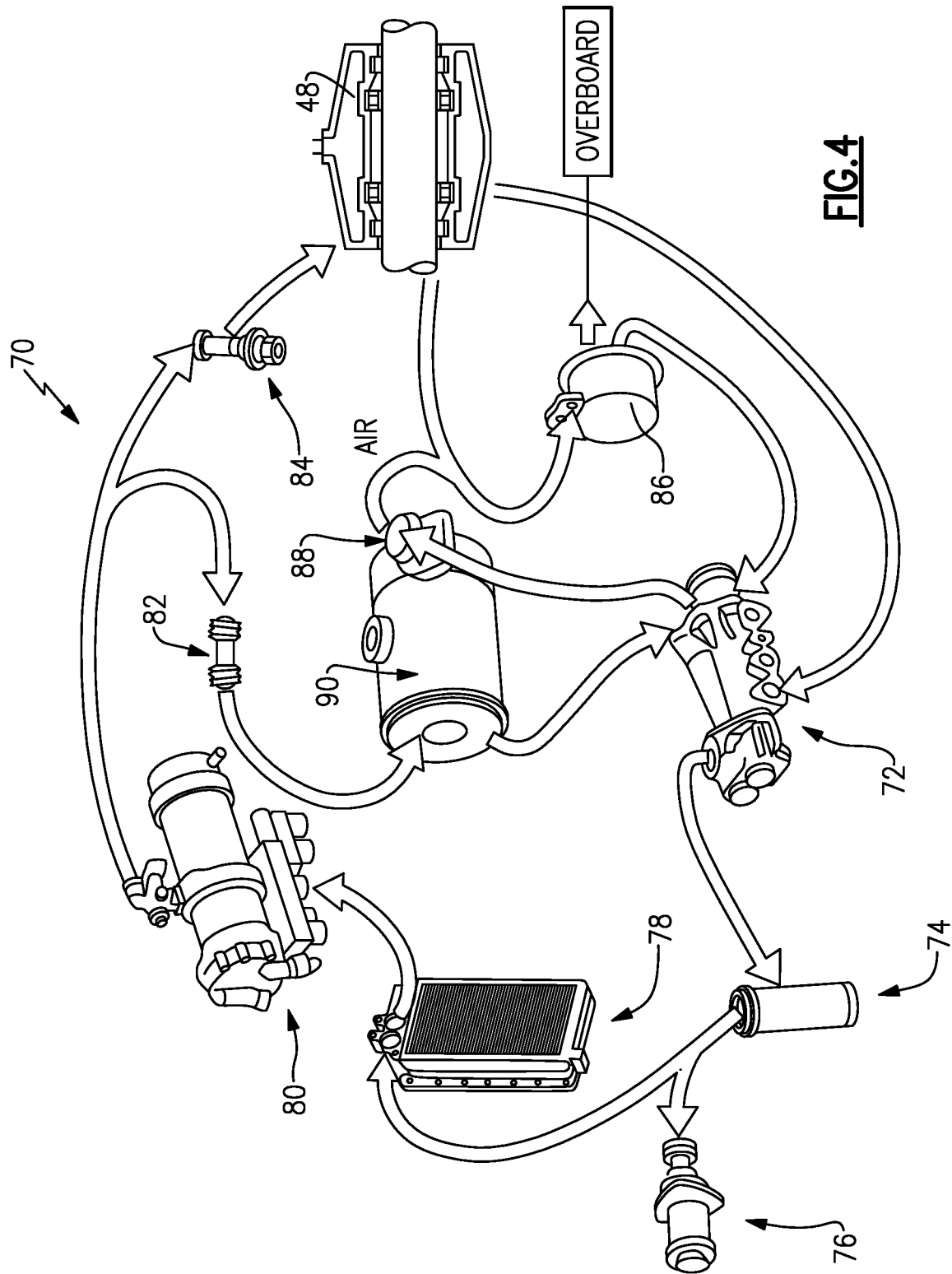
FIG. 4 shows a lubrication system.
Figure 5:
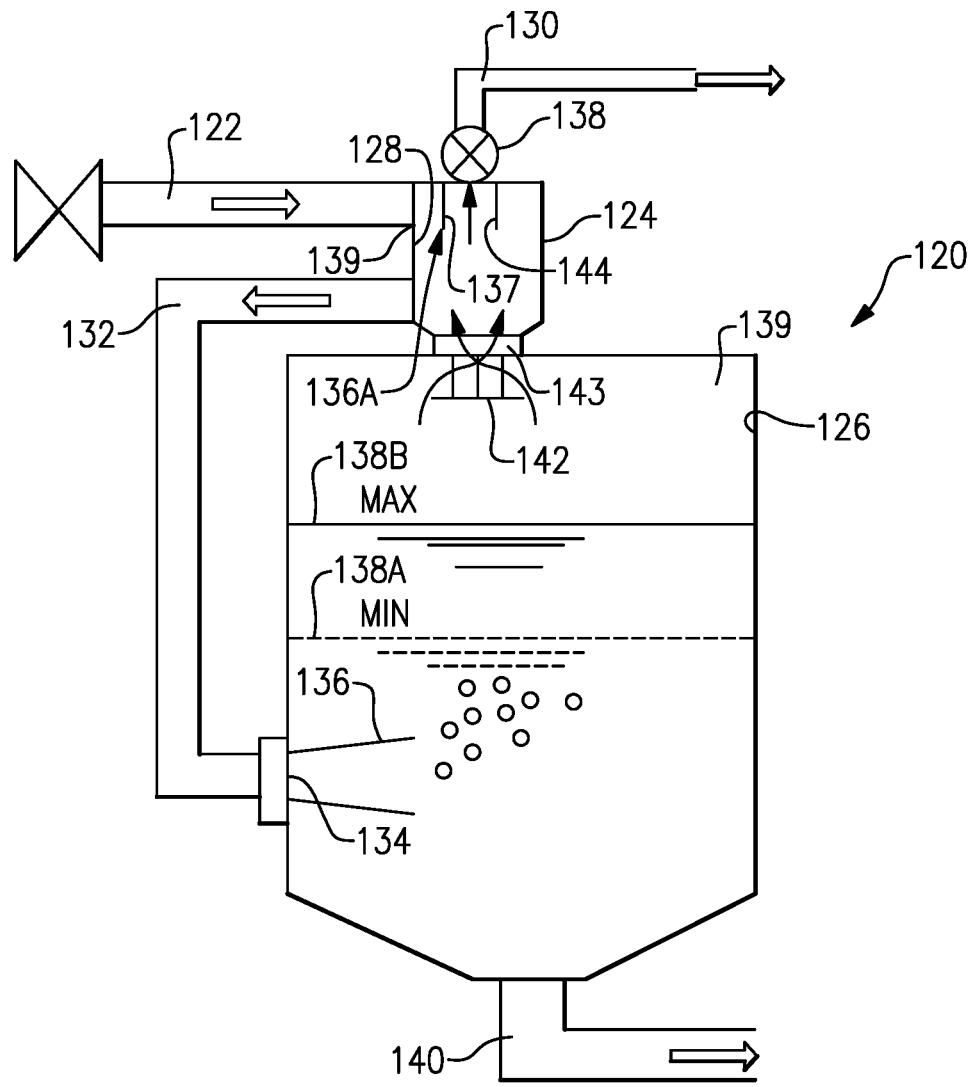
FIG. 5 shows a deaerator.

FIG. 5 shows a deaerator 124, and an oil tank 126, shown as an assembly 120. This assembly may be incorporated into the circuit of FIG. 4.

A mixed air and oil inlet line 122 enters into an interior 128 of the deaerator 124. This flow is at an inlet velocity less than or equal to 14 feet/second. Oil is separated, and flows outwardly of a bottom pipe 132 and into an inlet 134 within the oil tank 126. As shown, a conical diffuser 136 guides the oil flow into an oil level in the tank 126. There is a minimum oil level 138a and a maximum oil level 138b illustrated. Notably, a vertical location of the outlet 134 is at least 2 inches (5.08 centimeters) beneath the minimum oil level 138a.

Applicant has found that introducing the oil and air mixture into the oil tank is much "quieter," resulting in less re-aeration when it is delivered at least 2 inches (5.08 centimeters) below the free surface of the oil. As an example, if oil were sprayed onto the free surface, this could cause splashing and foaming.

An oil exit velocity leaving the pipe 132 and into the exit 134 may be less than 14 feet/second. High velocity oil and oil mixtures entering the tank may cause re-aeration. The 14 feet/second reduces the chances of re-aeration. In addition, the amount of oil as a percentage of the overall fluid entering the inlet 122 is greater than 5%, and the amount of air leaving the deaerator 124 through the external tube 130 will be less than 5%.

Air may still be entrained in the oil entering the outlet 134. This is illustrated by bubbles within the oil level. That air will move upwardly into an empty volume 139, and eventually pass around a deflector 142 in an air exit opening 143, and reenter the deaerator 124. This air will largely separate from the oil in the deaerator 124, passing to an exit guide 136A, through a breather valve 138, and leave through the breather tube 130. This flow is also at a velocity less than or equal to 14 feet/second.

Figure 6:
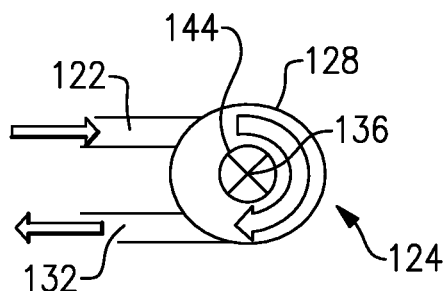
FIG. 6 is a schematic view of flow within the deaerator.

FIG. 6 shows the detail of the deaerator 124. The inlet 122 passes around the breather guide 144, against an opposed wall of the interior 128. This assists the air in separating and passing through outlet 130, and the oil separating and falling downwardly to pass into the pipe 132.

Returning to FIG. 5, it can be appreciated that a vertically lower end 137 of the exit guide 136A is vertically below a vertically lower end 139 of the inlet. Stated another way, the end 137 is spaced further toward a remote wall of the deaerator 124 than is the end 139 of the inlet tube 122. This ensures the mixed air and oil will largely pass around or against the exit guide, and less oil will be entrained upwardly to the air outlet 130.

Figure 7:
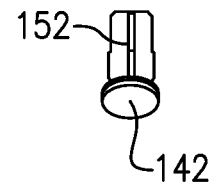
FIG. 7 shows a detail of an air escape.

FIG. 7 shows further details of the air outlet, including the deflector 142, and the vanes 152.

Figure 8A:
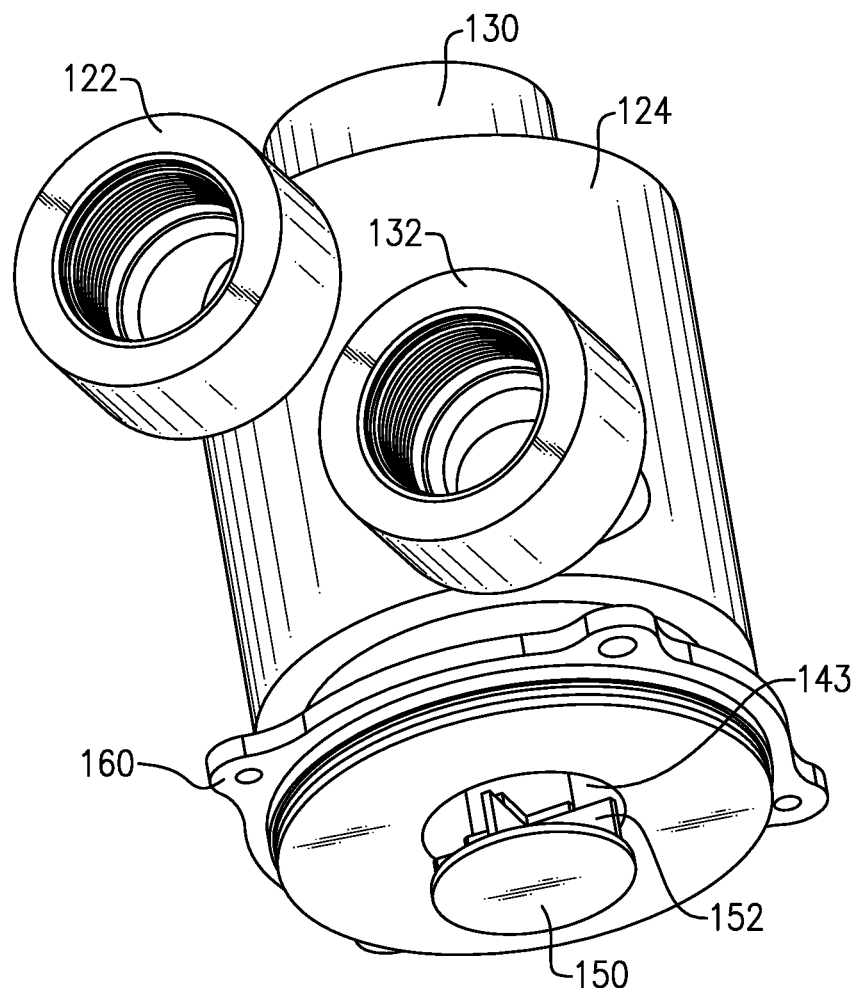
FIG. 8A shows a first external view of the deaerator.

FIG. 8A is a perspective view of the deaerator 124. As can be appreciated, there is the inlet 122, the oil outlet 132 and the air outlet 130. A mounting base 160 is illustrated, as is the opening 143, guide vanes 152, and deflector 150.

Figure 8B:
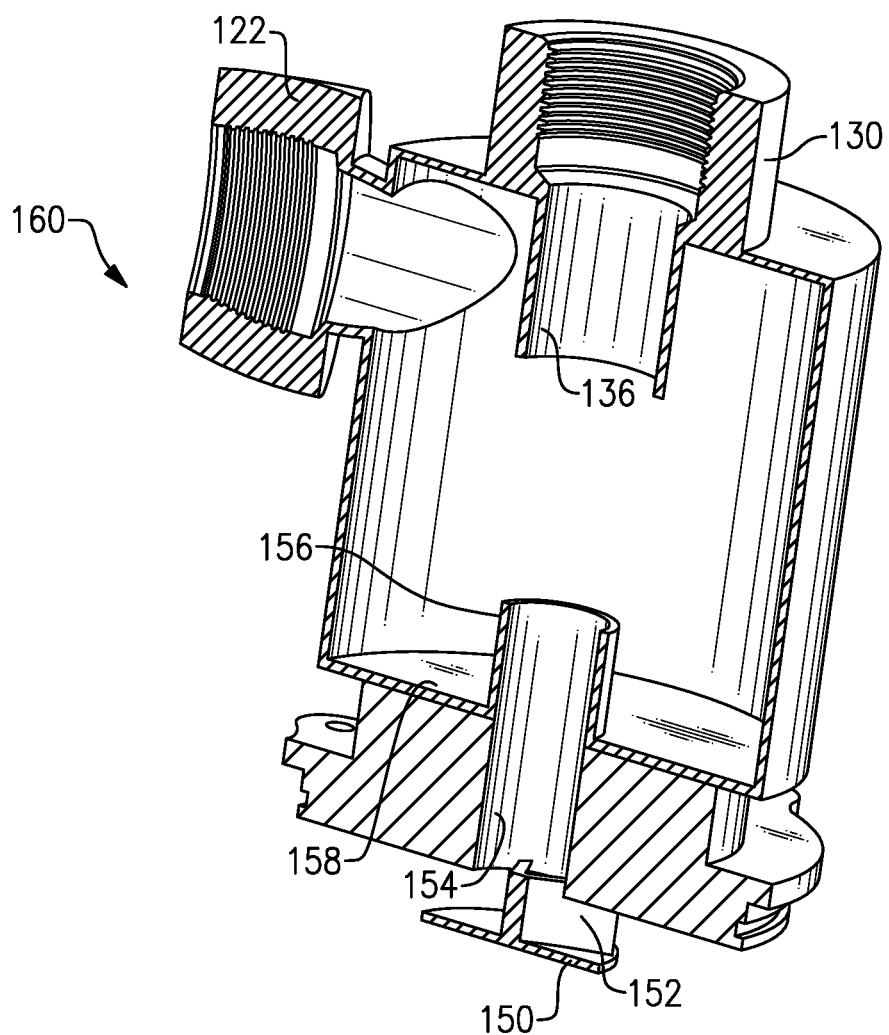
FIG. 8B is a cross-section through the deaerator.

FIG. 8B shows a distinct embodiment 160. In embodiment 160, the air inlet opening 154 extends upwardly to an inner end 156 which is spaced away from a base wall 158.

Otherwise, the deaerator 160 is similar to the prior disclosed deaerator.

Figure 8C:
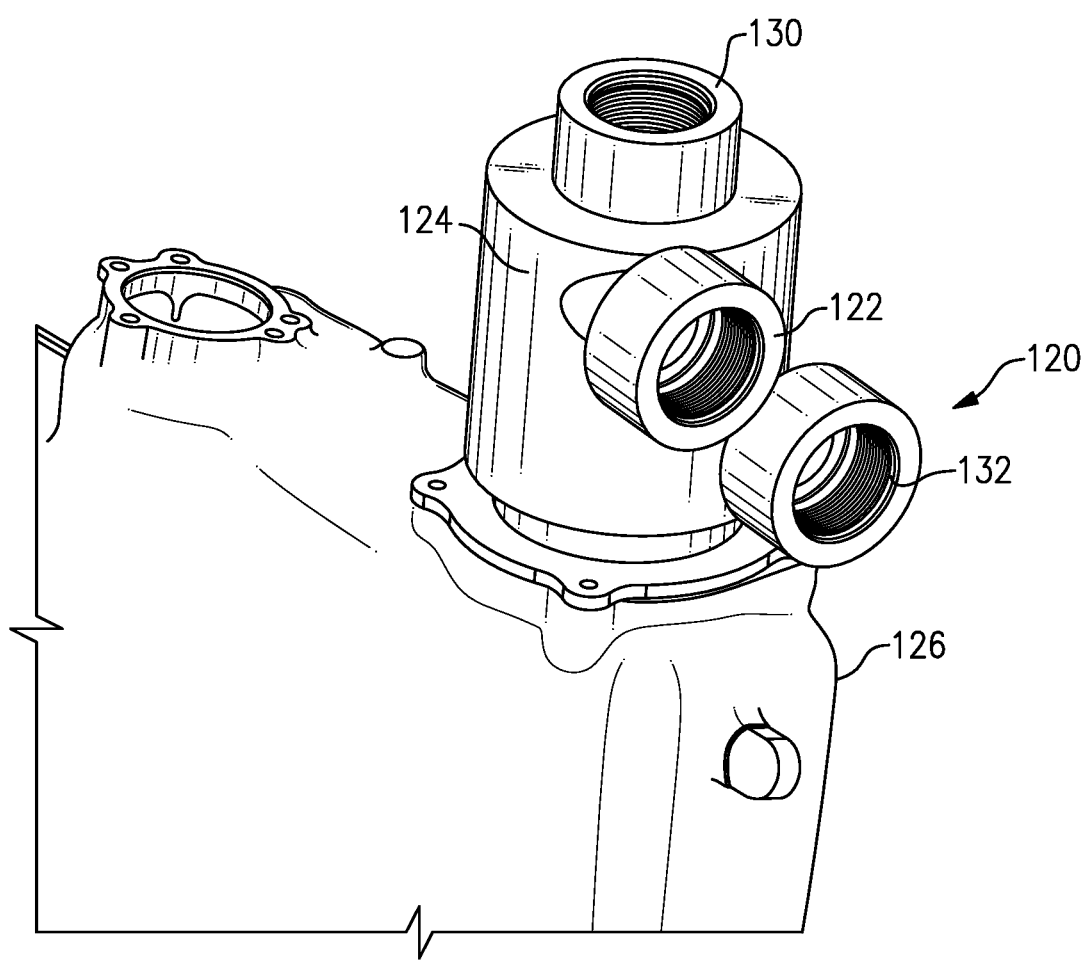
FIG. 8C shows the deaerator mounted on an oil tank.

FIG. 8C shows the assembly 120 of the deaerator 124 mounted on the oil tank 126.

Returning to FIG. 5, oil can pass from the oil tank 126 through the pipe 140 to the oil pump, or for other uses of the oil in the FIG. 4 circuit.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A gas turbine engine comprising:
  a propulsor drive turbine driving a gear reduction, said gear reduction driving a propulsor rotor;
  a lubrication system supplying oil to said gear reduction, the lubrication system including a lubricant pump supplying an air/oil mixture to an inlet of a deaerator, said deaerator including a separator separating oil and air, delivering separated air to an air outlet, and delivering separated oil back into an oil tank,
  air within the oil tank moves outwardly through an air exit and into the deaerator;

an inlet velocity of the air/oil mixture to the deaerator is less than or equal to 14 feet/second;

an exit velocity from the deaerator of the separated air is less than or equal to 14 feet/second;

a turbine pressure ratio, defined as an inlet pressure measured prior to an inlet to the propulsor drive turbine as compared to an outlet pressure measured at an outlet of the propulsor drive turbine prior to an exhaust nozzle, and said turbine pressure ratio being greater than 5.0; and a pipe having a pipe inlet connected to the deaerator to receive the separated oil from the deaerator, the pipe also connected to the oil tank at a pipe outlet at least 2 inches (5.08 centimeters) below a minimum oil level but above an inlet to an oil supply pipe within the oil tank.

2. The gas turbine engine as set forth in claim 1, wherein an exit guide extending into the deaerator from the air outlet, and the deaerator inlet delivering the air/oil mixture about the exit guide, and against a wall of the deaerator such that air and oil are separated, and the separated oil enters the oil tank through the pipe outlet and through a diffusor.

3. The gas turbine engine as set forth in claim 2, wherein a dwell time of oil in the oil tank as removed by said oil pump, on average, is five seconds or less.

4. The gas turbine engine as set forth in claim 3, wherein said oil tank holds greater than or equal to 25 and less than or equal to 35 quarts of oil.

5. The gas turbine engine as set forth in claim 3, wherein said gear reduction includes a sun gear for driving intermediate gears and there being oil baffles located circumferentially between said intermediate gears.

6. The gas turbine engine as set forth in claim 5, wherein an oil capture gutter surrounds said gear reduction.

7. The gas turbine engine as set forth in claim 3, wherein the air exit from the oil tank passes around a deflector to remove oil that may still be mixed with the air.

8. The gas turbine engine as set forth in claim 7, wherein the air exit includes a baffle extending away from an end of the deaerator, and toward the air outlet.

9. The gas turbine engine as set forth in claim 1, wherein said propulsor rotor is a fan rotor having a plurality of fan blades surrounded by a housing.

10. The gas turbine engine as set forth in claim 1, wherein a gear ratio defined by said gear reduction being greater than 2.3.

11. A method of operating a gas turbine engine comprising:

a propulsor drive turbine driving a gear reduction, said gear reduction driving a propulsor rotor; and a lubrication system supplying oil to said gear reduction, with an oil tank, the lubrication system including a lubricant pump; and supplying an air/oil mixture to an inlet of a deaerator, said deaerator separating oil and air, delivering separated air to an air outlet, and delivering separated oil back into the oil tank, air within the oil tank moving outwardly through an air exit to the deaerator, and an inlet velocity of the air/oil mixture to the deaerator is less than or equal to 14 feet/second and an exit velocity from the deaerator of the separated air is less than or equal to 14 feet/second; and a gear ratio defined by said gear reduction being greater than 2.3.

12. The method as set forth in claim 11, wherein the separated oil enters the oil tank through a diffusor.

13. The method as set forth in claim 12, wherein the separated oil from the deaerator moves into a pipe at a pipe outlet, the pipe also connected to the oil tank at a pipe outlet at least 2 inches (5.08 centimeters) below a minimum oil level but above an inlet to an oil supply pipe within the oil tank.

14. The method as set forth in claim 13, wherein a dwell time of oil in the oil tank as removed by said oil pump, on average, is five seconds or less.

15. The method as set forth in claim 14, wherein said oil tank holds greater than or equal to 25 and less than or equal to 35 quarts of oil.

16. The method as set forth in claim 15, wherein said gear reduction includes a sun gear for driving intermediate gears and there being oil baffles located circumferentially between said intermediate gears, and an oil capture gutter surrounds said gear reduction.

17. The gas turbine engine as set forth in claim 11, wherein said propulsor rotor is a fan rotor having a plurality of fan blades surrounded by a housing.

18. The method as set forth in claim 11, wherein the air exit from the oil tank passes around a deflector to remove oil that may still be mixed with the air.

19. The method as set forth in claim 18, wherein the air exit includes a baffle extending away from an end of the deaerator, and toward the air outlet.

20. A gas turbine engine comprising:

a propulsor drive turbine driving a gear reduction, said gear reduction driving a propulsor rotor; and a lubrication system supplying oil to said gear reduction, the lubrication system including a lubricant pump supplying an air/oil mixture to an inlet of a deaerator, said deaerator including a separator separating oil and air, delivering separated air to an air outlet, and delivering separated oil back into an oil tank, a pipe having a pipe inlet connected to the deaerator and the separated oil from the deaerator moving into the pipe inlet, the pipe also connected to the oil tank at a pipe outlet at least 2 inches (5.08 centimeters) below a minimum oil level but above an inlet to an oil supply pipe within the oil tank;

air within the oil tank moves outwardly through an air exit in the deaerator;

an inlet velocity of the air/oil mixture to the deaerator is less than or equal to 14 feet/second; and a dwell time of oil in the tank as removed by said oil pump, on average, is five seconds or less.

21. The gas turbine engine as set forth in claim 20, wherein an exit velocity from the deaerator of the separated air is less than or equal to 14 feet/second.

22. The gas turbine engine as recited in claim 20, a turbine pressure ratio, defined as an inlet pressure measured prior to an inlet to the propulsor drive turbine as compared to an outlet pressure measured at an outlet of the propulsor drive turbine prior to an exhaust nozzle, and said turbine pressure ratio being greater than 5.

23. The gas turbine engine as set forth in claim 22, wherein the deaerator has an air outlet, and an exit guide extending into the deaerator from the air outlet, and the deaerator inlet delivering the air/oil mixture about the exit guide, and against a wall of the deaerator such that air and oil are separated.

24. The gas turbine engine as set forth in claim 23, wherein the separated oil enters the oil tank through a diffusor.

25. The gas turbine engine as set forth in claim 24, wherein said oil tank holds greater than or equal to 25 and less than or equal to 35 quarts of oil.

26. The gas turbine engine as set forth in claim 25, wherein said gear reduction includes a sun gear for driving intermediate gears and there being oil baffles located circumferentially between said intermediate gears.

27. The gas turbine engine as set forth in claim 26, wherein an oil capture gutter surrounds said gear reduction.

28. The gas turbine engine as set forth in claim 20, wherein the separated oil enters the oil tank through a diffusor.

29. The gas turbine engine as set forth in claim 20, wherein said propulsor rotor is a fan rotor having a plurality of fan blades surrounded by a housing.

* * * * *